(12) United States Patent
Spain et al.

(10) Patent No.: US 7,058,811 B2
(45) Date of Patent: Jun. 6, 2006

(54) APPARATUS AND METHOD TO PREVENT A DEVICE DRIVER FROM LOADING ON A COUNTERFEIT HARDWARE ELEMENT

(75) Inventors: John R. Spain, Hillsboro, OR (US); Scott P. Dubal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 10/001,653

(22) Filed: Oct. 31, 2001

(65) Prior Publication Data

US 2003/0084297 A1  May 1, 2003

(51) Int. Cl.
*H04L 9/00* (2006.01)
(52) U.S. Cl. .................... 713/176; 713/177
(58) Field of Classification Search ............ 713/176
See application file for complete search history.

(56) References Cited

U.S. PATENT DOCUMENTS 4,723,284 A * 2/1988 Munck et al. ............. 713/159

2001/0056534 A1 * 12/2001 Roberts ...................... 713/168

* cited by examiner

*Primary Examiner*—Gilberto Barron, Jr.
*Assistant Examiner*—Venkat Perungavoor
(74) *Attorney, Agent, or Firm*—Pillsbury Winthrop Shaw Pittman LLP

(57) ABSTRACT

A hardware authenticity verification system includes a hardware element having a hardware address. A digital signature generator is included to create a digital signature of the hardware address of the hardware element. A memory element stores the digital signature of the hardware element. A software program is included to compare the digital signature of the hardware element to a known value.

If the digital signature of the hardware element matches the known value, the user may be granted read and write access to all memory locations within the memory element, including a location in which the hardware address is stored. On the other hand, if the hardware address of the hardware element does not match the known value, the hardware element will not properly function, because the manufacturer's software program is configured to not load on the hardware element if the hardware address of the hardware element does not match the known value.

18 Claims, 4 Drawing Sheets

Hardware authenticity verification system 100

APPARATUS AND METHOD TO PREVENT A DEVICE DRIVER FROM LOADING ON A COUNTERFEIT HARDWARE ELEMENT

BACKGROUND OF THE INVENTION

1. Field of the Invention

The present invention generally relates to a hardware authenticity verification system. More particularly, the present invention relates to a hardware authenticity verification system that (1) creates a digital signature of a hardware address of a hardware element, and (2) restricts the use of a manufacturer's device driver on a hardware element for which a user possesses a software program to compare the digital signature to a known value.

2. Discussion of the Related Art

Generally, when a computer system is turned on, an operating system performs several tasks to initialize the system. In some systems, such as packet switching devices or routers, initialization may be achieved with a BIOS (basic input/output system), firmware, or micro-code. One of the tasks that the operating system, BIOS, firmware, or micro-code performs is loading device drivers, which are typically software programs for adapters. Typically, a device driver is programmed to check a memory element, such as an EEPROM, only for corruption. The device driver generally does not require verification of a hardware element's authenticity (e.g., comparing a hardware element's hardware address with an address that is stored in the EEPROM) in order to load the device driver on the hardware element. The absence of authenticity verification provides an opportunity for a counterfeiter to successfully incorporate a non-authentic hardware element into the computer system or a network system without detection.

A counterfeiter may buy parts to build a hardware element from a gray-market vendor and, in fact, build an exact copy of the authentic hardware element. The counterfeiter may copy the entire contents of an authentic EEPROM image, for example, of the hardware element. The counterfeiter may change the hardware address of the hardware element to make it unique, and burn the new EEPROM image onto the counterfeit hardware element. This technique may allow all of the original manufacturer's device drivers to load on the counterfeit hardware element.

Believing that a counterfeit hardware element is authentic, a purchaser of the counterfeit hardware element may solicit the original manufacturer for support and/or demand replacement, thereby increasing the original manufacturer's support costs. The counterfeit hardware element is typically inferior in quality to an authentic hardware element, damaging the reputation of the original manufacturer. Because the original manufacturer's call center has no simple way of differentiating between an authentic hardware element and a counterfeit hardware element, the original manufacturer often replaces a defective hardware element at its expense, even if the defective hardware element is counterfeit.

Thus, a system that verifies the authenticity of a hardware element is required.

DETAILED DESCRIPTION

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" or "according to an embodiment" appearing in various places throughout the specification are not necessarily all referring to the same embodiment.

Figure 1:
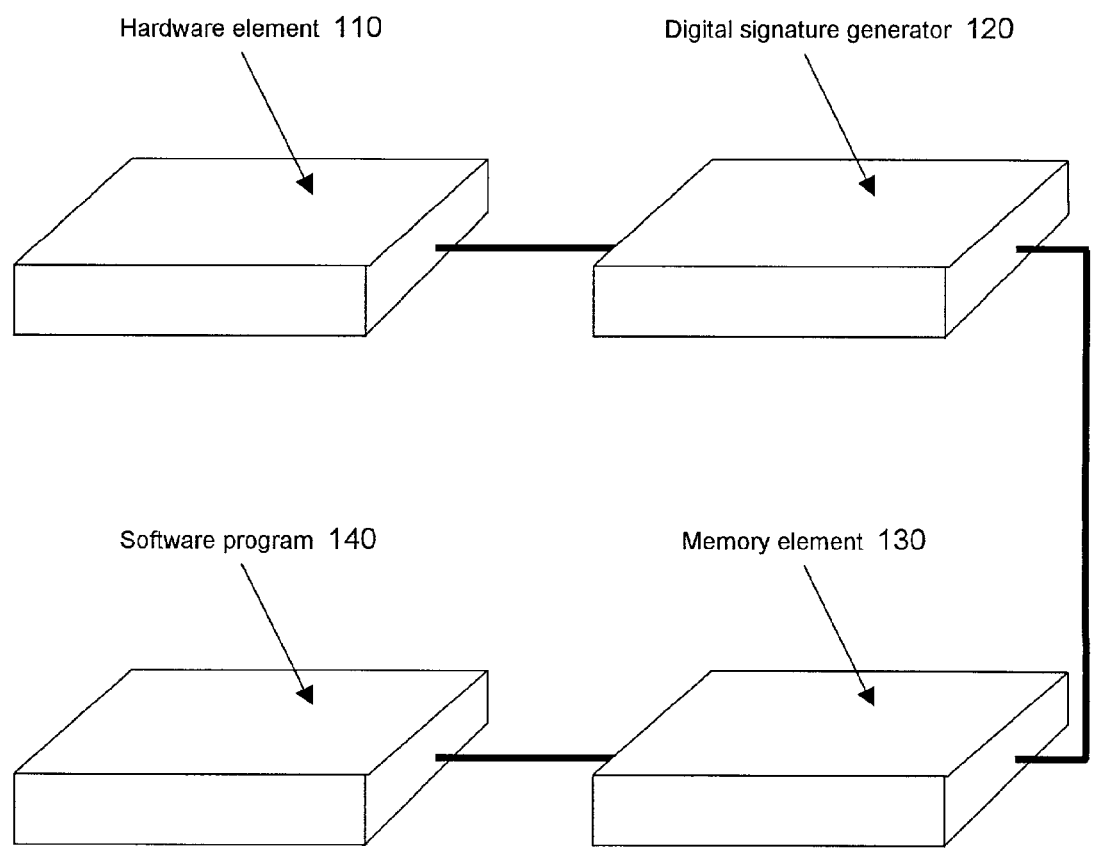
FIG. 1 illustrates a hardware authenticity verification system according to an embodiment of the present invention.

FIG. 1 illustrates a hardware authenticity verification system according to an embodiment of the present invention. The hardware authenticity verification system 100 includes a hardware element 110, a digital signature generator 120, a memory element 130, and a software program 140. The hardware element 110 has a hardware address, which must be unique within a network system for proper operation of the network system. Examples of a hardware element 110 include a network adapter, a hard drive, and a display. The digital signature generator 120 creates a digital signature of the hardware address of the hardware element 110. The memory element 130 stores the digital signature of the hardware element 110. The software program 140 compares the digital signature of the hardware element to a known value.

According to an embodiment of the invention, the software program 140 is a device driver. The device driver itself may decrypt the digital signature of the hardware element 110 that is stored in the memory element 130.

According to another embodiment, the hardware element 110 is a network adapter; however, the hardware element 110 may be any other suitable device.

In another embodiment of the invention, the digital signature generator 120 manipulates the hardware address of the hardware element 110 with a hash algorithm. In a preferred embodiment, the digital signature generator 120 encrypts the hardware address of the hardware element 110 with a private key. According to yet another embodiment of the invention, the hardware authenticity verification system 100 is included in a data processing device.

Figure 2:
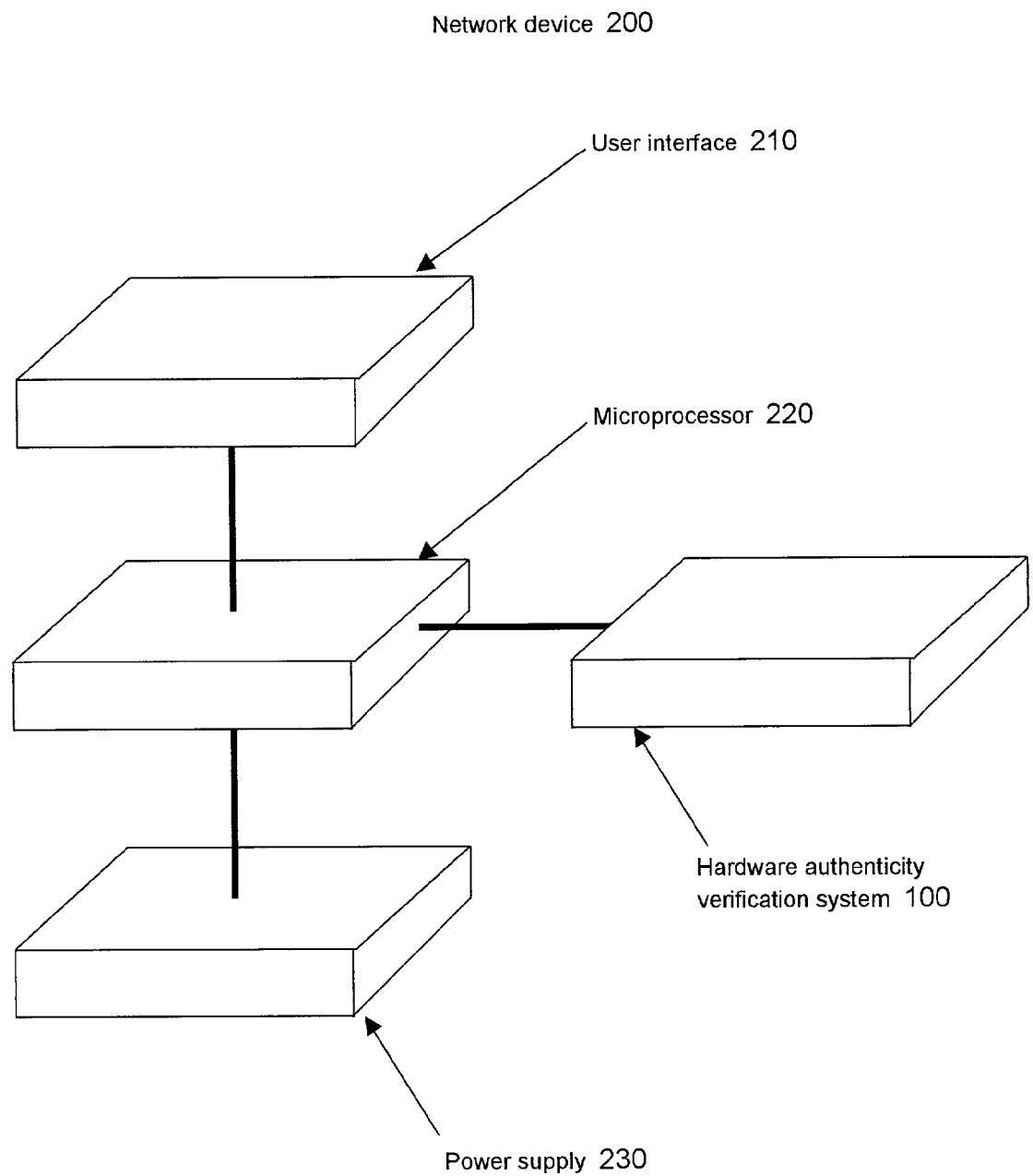
FIG. 2 illustrates a network device according to an embodiment of the present invention.

FIG. 2 illustrates a network device according to an embodiment of the present invention. The network device 200 includes a user interface 210, a microprocessor 220, a power supply 230, and a hardware authenticity verification system 100. The user interface 210 receives information from a user. The microprocessor 220 processes the information that is received from the user. The power supply 230 supplies power to the network device. The hardware authenticity verification system 100 verifies authenticity of a hardware element 110 (see FIG. 1).

Figure 3:
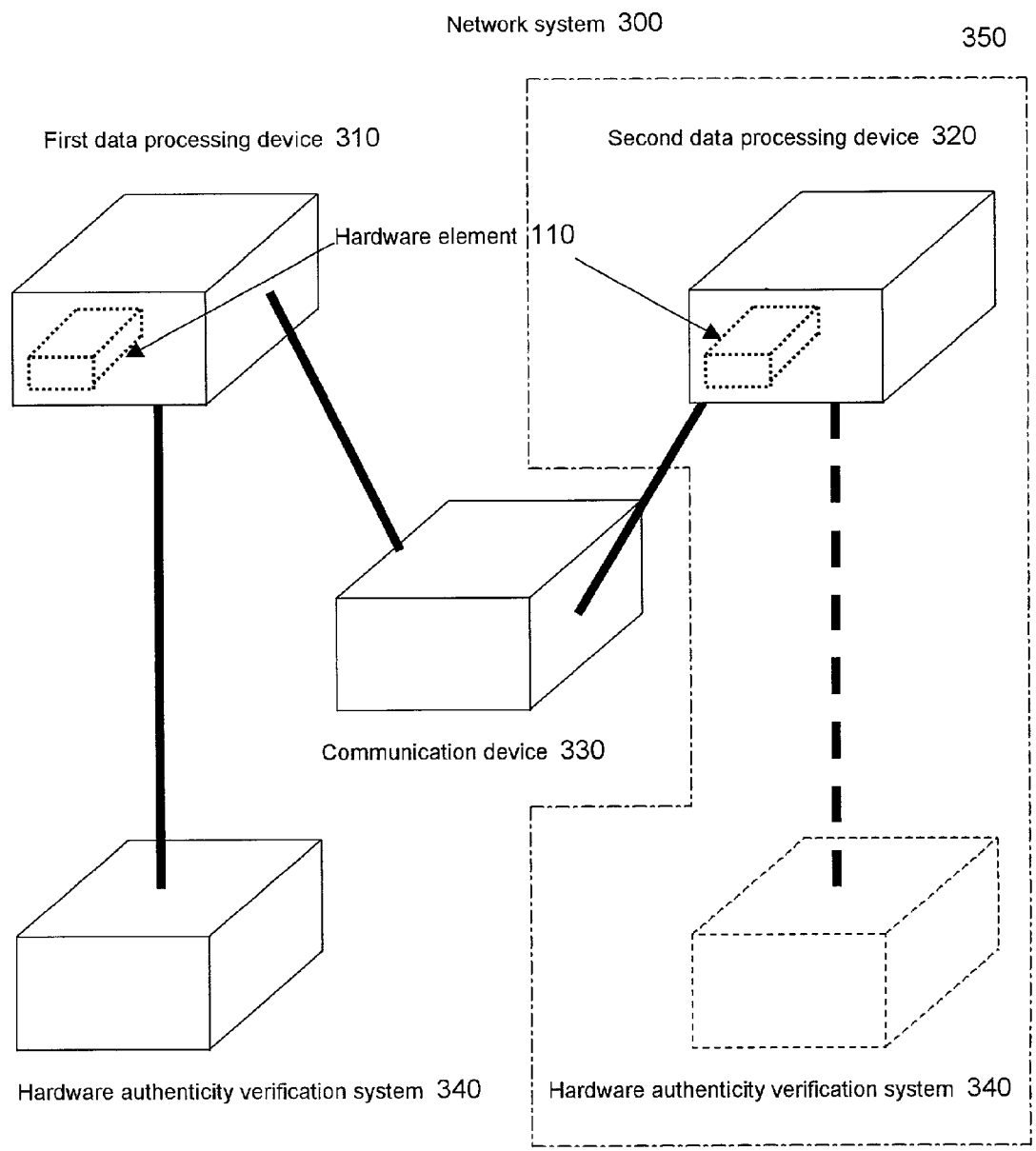
FIG. 3 illustrates a network system according to an embodiment of the present invention.

FIG. 3 illustrates a network system according to an embodiment of the present invention. The network system 300 includes a first data processing device 310, a second data processing device 320, a communication device 330, and a hardware authenticity verification system 340. The first data processing device 310 communicates with the communication device 330. The communication device 330 also communicates with the second data processing device 320. The hardware authenticity verification system 340 verifies the authenticity of a hardware element 110. Within element 350, a hardware authenticity verification system 340 may also be provided to verify the authenticity of a hardware element 110. The hardware authenticity verification system 340 may be included in the first data processing device 310 and/or the second data processing device 320.

Figure 4:
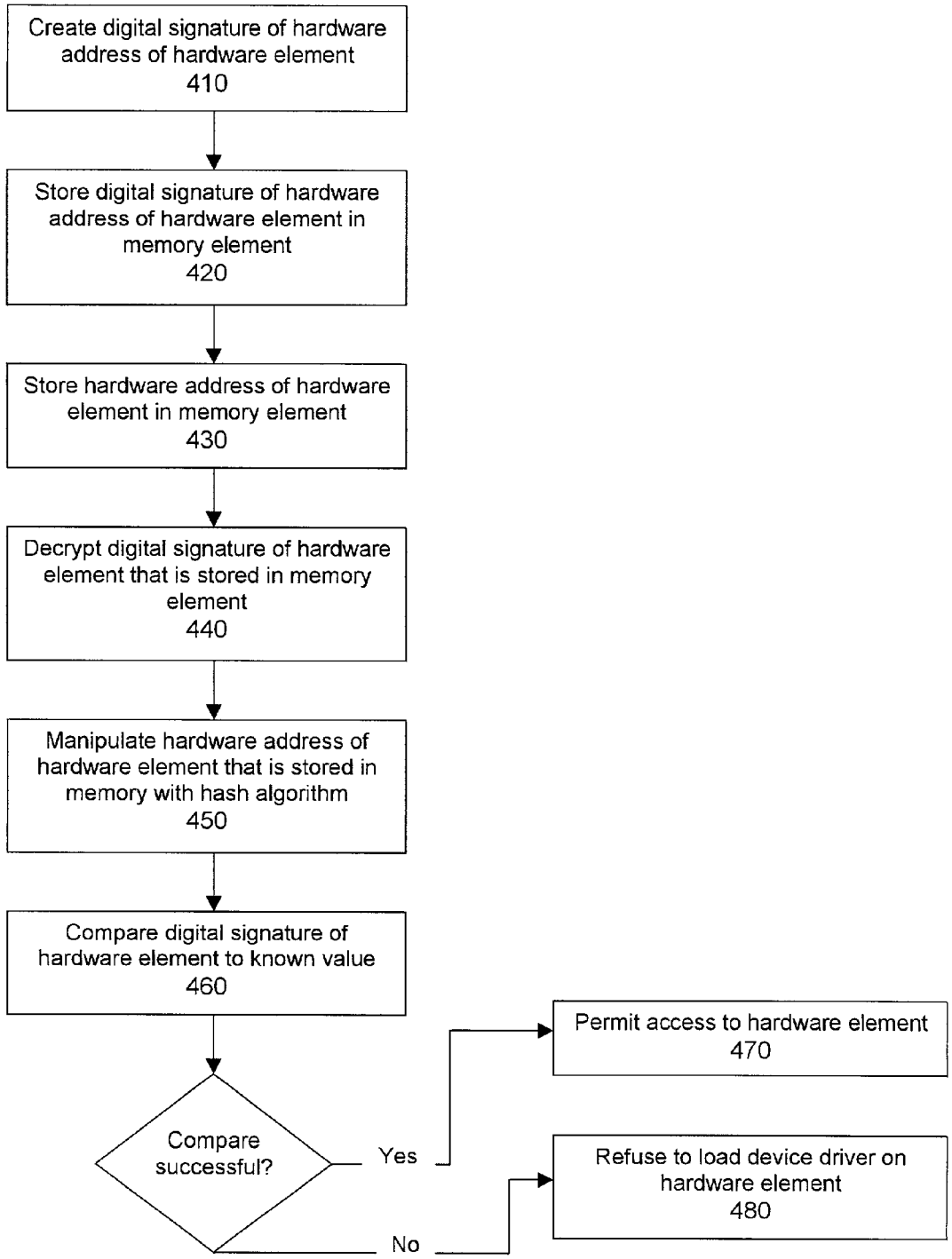
FIG. 4 illustrates a flow chart for a method of verifying the authenticity of a hardware element according to an embodiment of the present invention.

FIG. 4 illustrates a flow chart for a method of verifying the authenticity of a hardware element according to an embodiment of the present invention. Within the method and referring to FIG. 1, a digital signature generator 120 creates 410 a digital signature of a hardware address of the hardware element 110. The digital signature of the hardware address of the hardware element 110 is stored 420 in a memory element 130. The hardware address of the hardware element 110 may also be stored 430 in the memory element 130. The digital signature of the hardware element 110 that is stored in the memory element 130 is preferably decrypted 440. The hardware address of the hardware element 110 that is stored in memory may be manipulated 450 with a hash algorithm. The digital signature of the hardware element 110 is compared 460 to a known value. The known value is preferably the hardware address of the hardware element 110 that has been manipulated by the hash algorithm. If the compare is successful (i.e., if the digital signature of the hardware element 110 is same as the known value), then access is permitted 470 to the hardware element. If the compare is not successful, then the manufacturer's software program 140 may refuse 480 to load on the hardware element 110 and/or issue a warning.

In short, the hardware authenticity verification system 100 according to the present invention creates a digital signature of a hardware address of a hardware element 110, so that a manufacturer of a hardware element 110 may prevent the use of its software program 140 on a counterfeit hardware element. The digital signature is preferably produced by (1) manipulating the hardware address of the hardware element 110 with the hash algorithm, and (2) encrypting the result of the hash algorithm manipulation with a private key. The digital signature is stored in the memory element 130, preferably along with the unaltered hardware address of the hardware element 110. The manufacturer's device driver preferably contains a public key to decrypt the digital signature. If the digital signature matches the hardware address of the hardware element 110 after being manipulated by the hash algorithm, the user may be granted read and write access to all memory locations within the memory element 130, including a location in which the hardware address is stored. On the other hand, if the hardware address of the hardware element 110 is not valid (i.e., if the decrypted digital signature does not match the hardware address of the hardware element 110 after being manipulated by the hash algorithm), the hardware element 110 will not properly function, because the manufacturer's software program 140 may be configured to not load on the hardware element 110 if the digital signature is not properly decrypted.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of verifying authenticity of a hardware element, comprising:

creating a digital signature of a hardware address in a data processing device of the hardware element, the hardware element being located in the data processing device;

storing the digital signature of the hardware address of the hardware element in a memory element located in the data processing device;

comparing the digital signature of the hardware element to a known value; and loading a device driver onto the hardware element only if the digital signature of the hardware element is same as the known value.

2. The method according to claim 1, wherein the method further includes decrypting the digital signature of the hardware element that is stored in the memory element before the digital signature is compared to the known value.

3. The method according to claim 1, wherein the method further includes storing the hardware address of the hardware element in the memory element.

4. The method according to claim 1, wherein the method further includes manipulating the hardware address of the hardware element that is stored in memory with a hash algorithm to generate the known value which is compared to the digital signature of the hardware element.

5. The method according to claim 1, wherein the hardware element is a network adapter.

6. The method according to claim 1, wherein creating the digital signature includes manipulating the hardware address of the hardware element with a hash algorithm and encrypting the hashed hardware address of the hardware element with a private key before the encrypted hashed key hardware address is stored in the memory element.

7. A hardware authenticity verification system, comprising:

a machine-readable storage medium; and machine-readable program code, stored on the machine-readable storage medium, the machine-readable program code having instructions, which when executed cause a data processing device to:

create a digital signature of a hardware address of a hardware element installed in the data processing device;

store the digital signature of the hardware address of the hardware element in a memory element;

compare the digital signature of the hardware element to a known value; and load device driver software onto to the hardware element only if the digital signature of the hardware element is the same as the known value.

8. The hardware authenticity verification system according to claim 7, wherein the machine-readable program code includes instructions, which when executed cause the data processing device to decrypt the digital signature of the hardware element that is stored in the memory element before comparing the digital signal of the hardware element to a known value.

9. The hardware authenticity verification system according to claim 7, wherein the machine-readable program code includes instructions, which when executed cause the data processing device to store the hardware address of the hardware element in the memory element.

10. The hardware authenticity verification system according to claim 9, wherein the machine-readable program code includes instructions, which when executed cause the data processing device to manipulate the hardware address of the hardware element that is stored in memory with a hash algorithm to generate the known value which is compared to the digital signature of the hardware element.

11. The hardware authenticity verification system according to claim 7, wherein the hardware element is a network adapter.

12. The hardware authenticity verification system according to claim 7, wherein the machine-readable program code includes instructions, which when executed cause the data processing device to manipulate the hardware address of the hardware element with a hash algorithm and encrypt the hashed hardware address of the hardware element with a private key before the encrypted hashed key hardware address is stored in the memory element.

13. A verification system, comprising:
   a machine-readable storage medium; and
   machine-readable program code, stored on the machine-readable storage medium, the machine-readable program code having instructions, which when executed cause a data processing device to:
   create a digital signature of a hardware address of a network adapter installed in the data processing device;
   store the digital signature of the hardware address of the network adapter in a memory element;
   compare the digital signature of the network adapter to a known value; and
   load device driver software onto the network adapter only if the digital signature of the network adapter is the same as the known value.

14. The verification system according to claim 13, wherein the machine-readable program code includes instructions, which when executed cause the data processing device to decrypt the digital signature of the network adapter that is stored in the memory element before comparing the digital signal of the network adapter to a known value.

15. The verification system according to claim 13, wherein the machine-readable program code includes instructions which when executed cause the data processing device to manipulate the hardware address of the network adapter with a hash algorithm and encrypt the hashed hardware address of the network adapter with a private key before the encrypted hashed key hardware address is stored in the memory element.

16. A method of verifying authenticity, comprising:
   creating a digital signature of a hardware address in a data processing device of a network adapter, the network adapter being located in the data processing device;
   storing the digital signature of the hardware address of the network adapter in a memory element located in the data processing device;
   comparing the digital signature of the network adapter to a known value; and
   loading a device driver onto the network adapter only if the digital signature of the network adapter is same as the known value.

17. The method according to claim 16, wherein the method further includes decrypting the digital signature of the network adapter that is stored in the memory element before the digital signature is compared to the known value.

18. The method according to claim 16, wherein creating the digital signature includes manipulating the hardware address of the network adapter with a hash algorithm and encrypting the hashed hardware address of the network adapter with a private key before the encrypted hashed key hardware address is stored in the memory element.

* * * * *